United States Patent
Lee et al.

(10) Patent No.: US 10,892,529 B2
(45) Date of Patent: Jan. 12, 2021

(54) AIR-COOLING BATTERY MODULE

(71) Applicant: LG CHEM, LTD., Seoul (KR)

(72) Inventors: Jung-Hoon Lee, Daejeon (KR);
Eun-Gyu Shin, Daejeon (KR);
Byoung-Cheon Jeong, Daejeon (KR);
Dal-Mo Kang, Daejeon (KR); Jeong-O Mun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 249 days.

(21) Appl. No.: 16/066,228

(22) PCT Filed: Nov. 29, 2017

(86) PCT No.: PCT/KR2017/013855
§ 371 (c)(1),
(2) Date: Jun. 26, 2018

(87) PCT Pub. No.: WO2018/101751
PCT Pub. Date: Jun. 7, 2018

(65) Prior Publication Data
US 2019/0051957 A1 Feb. 14, 2019

(30) Foreign Application Priority Data
Nov. 29, 2016 (KR) .......... 10-2016-0160635

(51) Int. Cl.
*H01M 10/6566* (2014.01)
*H01M 10/6563* (2014.01)
(Continued)

(52) U.S. Cl.
CPC ......... *H01M 10/6566* (2015.04); *H01M 2/10* (2013.01); *H01M 2/1061* (2013.01);
(Continued)

(58) Field of Classification Search
CPC ........... H01M 10/6566; H01M 10/613; H01M 10/647; H01M 10/6551; H01M 10/6554;
(Continued)

(56) References Cited

U.S. PATENT DOCUMENTS 6,410,185 B1   6/2002  Takahashi et al.
8,377,582 B2   2/2013  Eom
(Continued)

FOREIGN PATENT DOCUMENTS

CN    204407447 U    6/2015
CN    205376690 U    7/2016
(Continued)

OTHER PUBLICATIONS

International Search Report for PCT/KR2017/013855 (PCT/ISA/210) dated Mar. 30, 2018.

*Primary Examiner* — Jimmy Vo
(74) *Attorney, Agent, or Firm* — Birch, Stewart, Kolasch & Birch, LLP

(57) ABSTRACT

Discussed is an air-cooling battery module, which includes a cell assembly having a plurality of cells and a cooling member having a duct disposed to contact an edge portion of the cell assembly and having an air passage formed therein so that a cooling air moves therethrough, wherein the inside of the duct has a truss structure.

9 Claims, 3 Drawing Sheets

(51) Int. Cl.
- *H01M 10/6556* (2014.01)
- *H01M 10/613* (2014.01)
- *H01M 10/647* (2014.01)
- *H01M 2/10* (2006.01)
- *H01M 10/6551* (2014.01)
- *H01M 10/6554* (2014.01)

(52) U.S. Cl.
CPC ....... *H01M 2/1077* (2013.01); *H01M 10/613* (2015.04); *H01M 10/647* (2015.04); *H01M 10/6551* (2015.04); *H01M 10/6554* (2015.04); *H01M 10/6556* (2015.04); *H01M 10/6563* (2015.04)

(58) Field of Classification Search
CPC ......... H01M 10/6556; H01M 10/6563; H01M 2/10; H01M 2/1061; H01M 2/1077
See application file for complete search history.

(56) References Cited

U.S. PATENT DOCUMENTS

| | | | |
|---|---|---|---|
| 9,499,068 | B2 | 11/2016 | Yang et al. |
| 2003/0008205 | A1 | 1/2003 | Horie et al. |
| 2006/0214641 | A1 | 9/2006 | Cho |
| 2011/0052960 | A1 | 3/2011 | Kwon et al. |
| 2012/0237806 | A1 | 9/2012 | Choi et al. |
| 2013/0244078 | A1 | 9/2013 | Kwak et al. |
| 2015/0064535 | A1 * | 3/2015 | Seong ............... H01M 10/6563 429/120 |

FOREIGN PATENT DOCUMENTS

| | | | | |
|---|---|---|---|---|
| FR | 2745422 A1 * | 8/1997 | ........ | H01M 10/6566 |
| JP | 2000-306563 A | 11/2000 | | |
| JP | 2006-324041 A | 11/2006 | | |
| JP | 2007-299638 A | 11/2007 | | |
| JP | 2008-201371 A | 9/2008 | | |
| JP | 2010-515219 A | 5/2010 | | |
| JP | 2012-84314 A | 4/2012 | | |
| JP | 2012-164456 A | 8/2012 | | |
| JP | 2012-169227 A | 9/2012 | | |
| JP | 2013-229125 A | 11/2013 | | |
| JP | 2016-81844 A | 5/2016 | | |
| JP | 2016-151391 A | 8/2016 | | |
| KR | 10-2006-0102851 A | 9/2006 | | |
| KR | 10-2011-0090468 A | 8/2011 | | |
| KR | 10-2014-0058759 A | 5/2014 | | |
| KR | 10-2014-0140678 A | 12/2014 | | |
| KR | 10-2016-0016499 A | 2/2016 | | |
| WO | WO 94/02969 A1 | 2/1994 | | |
| WO | WO 2005/061981 A1 | 7/2005 | | |
| WO | WO 2008/078586 A1 | 7/2008 | | |

* cited by examiner

AIR-COOLING BATTERY MODULE

TECHNICAL FIELD

The present application claims priority to Korean Patent Application No. 10-2016-0160635 filed on Nov. 29, 2016 in the Republic of Korea, the disclosures of which are incorporated herein by reference.

The present disclosure relates to an air-cooling battery module, and more particularly, to a battery module having a structure capable of cooling cells by using an air.

BACKGROUND ART

Generally, a battery module includes a plurality of cells aggregated by serial and/or parallel connections. The battery module typically includes a cell assembly having a plurality of cells arranged in one direction and a frame having a plate capable of surrounding the cell assembly.

In a conventional battery module, if a cooling channel is separately designed in an air cooling type for cooling battery cells, the space occupied by the cooling channel is separately required. For this reason, it is difficult to simplify the structure and the capacity of cells to be mounted is limited. In other words, as shown in FIGS. 1 and 2, the conventional battery module is generally configured so that a cooling air is introduced through an inlet at one side of a housing 3 accommodating a cell assembly 1, is moved through an air gap 2 and then is discharged through a cooling fin to an outlet at the other side.

However, in this configuration, it is difficult to reduce the weight of the module. Moreover, a large space is required for installing components in the module, and the space utilization in the thickness direction of the cells is reduced, thereby reducing the capacity and lowering the cooling performance due to low thermal conductivity. In addition, since the air gap and the cooling fin are required, the cost increases.

In relation to the cooling technology of the battery module, Korean Unexamined Patent Publication No. 2014-0140678 discloses a battery pack having a guide member provided between a first battery module group and a second battery module group to change a channel of a heat exchange medium passing through the first battery module group. According to Korean Unexamined Patent Publication No. 2014-0140678, the heat exchange medium passing through the battery module is blocked by the guide member, so that the heat exchange medium is directed to a lower portion of the guide member. At this time, the guide member has a curved interior to prevent the occurrence of turbulence in the heat exchange medium.

Korean Unexamined Patent Publication No. 2016-0016499 discloses a battery module in which a plurality of cartridges and a cooling duct for supplying a cooling gas to the outside of the plurality of stacked cartridges are included, so that the cooling duct supplies a cooling gas to directly contact the outer surface of the cartridges.

In spite of the above technologies, the conventional battery module still has problems in that the components added for cooling increase the weight of the battery module and deteriorate the space utilization, and thus a countermeasure is required.

DISCLOSURE

Technical Problem

The present disclosure is designed to solve the problems of the related art, and therefore the present disclosure is directed to providing a battery module, which has an air-cooling structure capable of cooling a cell edge portion having high thermal conductivity to increase the cooling performance and enhance the space utilization in the thickness direction of the cells.

Another purpose of the present disclosure is to provide a battery module which may improve the stiffness of the air-cooling structure.

Technical Solution

In one aspect of the present disclosure, there is provided an air-cooling battery module, comprising: a cell assembly having a plurality of cells; and a cooling member having a duct disposed to contact an edge portion of the cell assembly and having an air passage formed therein so that a cooling air moves therethrough, wherein the inside of the duct has a truss structure.

Preferably, the air-cooling battery module may further comprise a heat transfer material portion provided between the edge portion of the cell assembly and the cooling member.

An outer surface of the duct of the cooling member may be disposed to directly contact the heat transfer material portion.

An uneven pattern may be formed at the inside of the duct of the cooling member.

The uneven pattern may be formed at the truss structure.

Turbulence forming protrusions may be formed at an inner wall of the duct of the cooling member to protrude at predetermined intervals.

The turbulence forming protrusions may have a rod-type structure vertically protruding from the inner wall of the duct of the cooling member.

The duct of the cooling member may be made of an aluminum material.

The cooling member may be respectively provided at both sides of the cell assembly and disposed to extend in a longitudinal direction of the cell assembly.

The air-cooling battery module may further comprise an exhaust fan disposed at an outlet to discharge an air, moved from one end of the cooling member to the other end thereof, in a vertically upward direction.

Advantageous Effects

The air-cooling battery module according to the present disclosure gives the following effects.

First, since the truss structure is provided in the duct of the cooling member, it is possible to improve the cooling performance and reinforce the mechanical rigidity.

Second, since a cooling fin may be not used, unlike the conventional battery module, it is possible to enhance the space utilization in the thickness direction of the cells.

Third, the cooling performance may be improved by the uneven portions and the protruding portions formed in the duct.

Fourth, the component tolerance may be minimized by forming the duct of the cooling member using an aluminum material.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
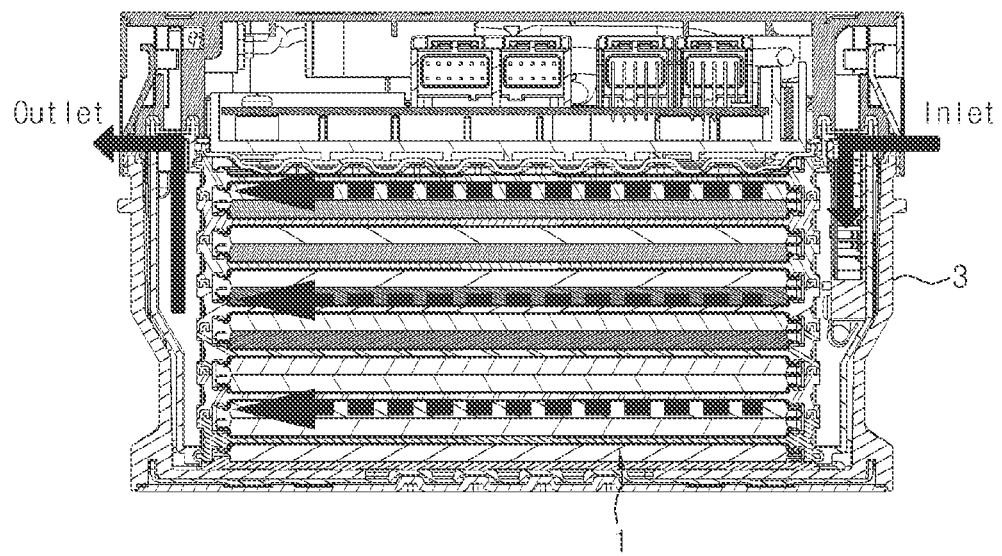
FIG. 1 is a cross-sectioned view showing a conventional battery module.
Figure 2:
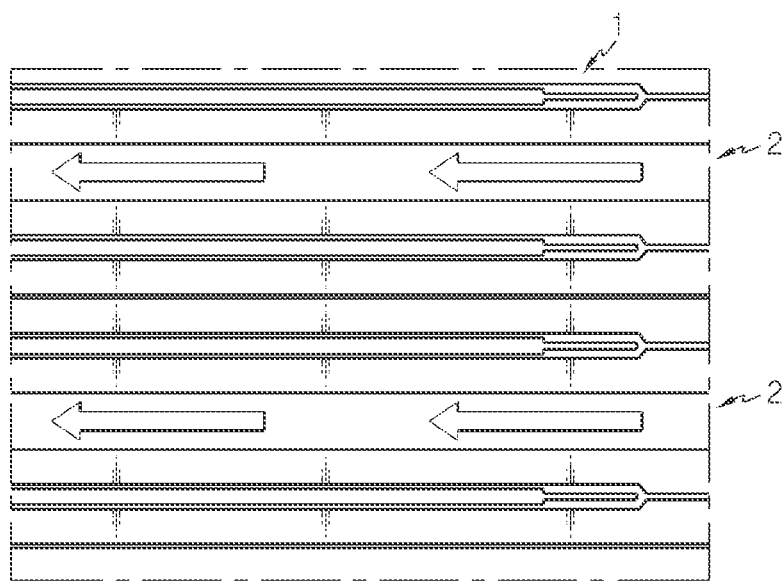
FIG. 2 is a cross-sectioned view showing an air channel of FIG. 1.
Figure 3:
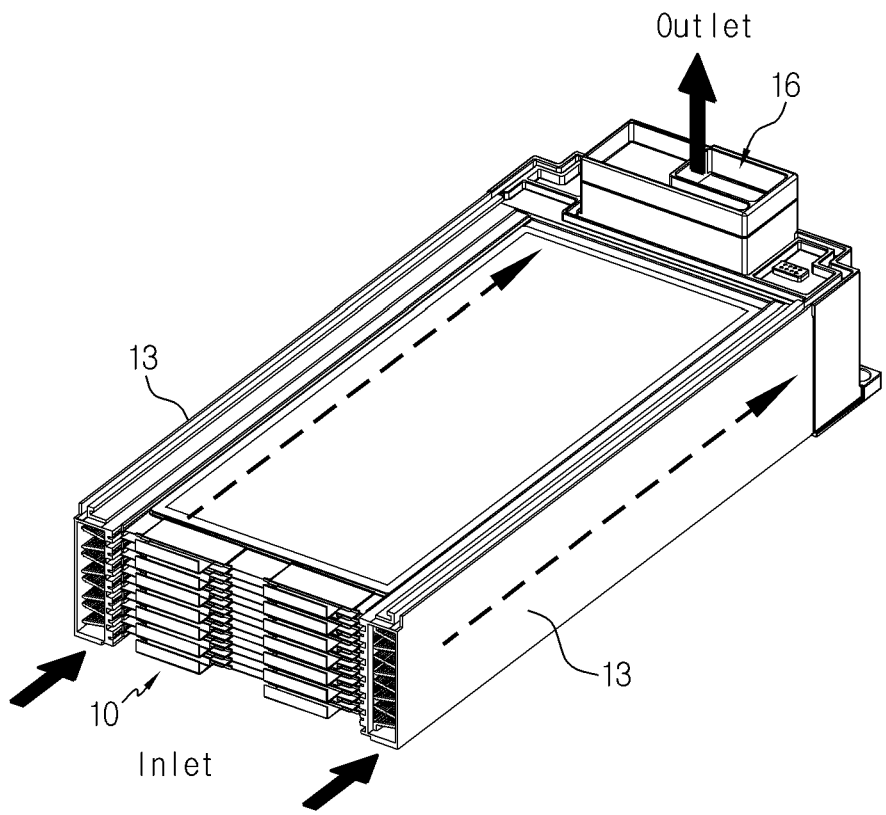
FIG. 3 is a perspective view showing an appearance of a battery module according to an embodiment of the present disclosure.

FIG. 3 is a perspective view showing an appearance of a battery module according to an embodiment of the present disclosure.

Referring to FIG. 3, a battery module according to an embodiment of the present disclosure includes a cell assembly 10 having a plurality of cells and a cooling member 13 having a duct disposed at both side edge portions of the cell assembly 10.

Each cell 11 of the cell assembly 10 has a thin plate-like body and preferably has a pouch cell structure. The pouch cell includes a positive electrode, a separator and a negative electrode, which are alternately stacked so that an electrode tab is drawn out from at least one side thereof. The positive electrode and the negative electrode are fabricated by coating slurry containing an electrode active material, a binder resin, a conductive agent and other additives to at least one side of a current collector. In the case of a positive electrode, a common positive electrode active material such as a lithium-containing transition metal oxide may be used as the electrode active material. In the case of a negative electrode, a common negative electrode active material such as a lithium metal capable of intercalating and de-intercalating lithium ions, a carbonaceous material, a metal compound, or compounds thereof may be used as the electrode active material. In addition, the separator may adopt a common porous polymer film used in a lithium secondary battery.

A common electrolyte for a lithium secondary battery may be employed as the electrolyte contained in a pouch case together with the electrode assembly. The pouch case is formed of sheet material and has an accommodating portion for accommodating the electrode assembly. Preferably, the pouch case is formed by coupling a first case and a second case, which are prepared by processing a sheet material into a predetermined shape. The sheet material of the pouch case has a multi-layered structure including an outer resin layer provided at an outermost side and made of an insulating material such as polyethylene terephthalate (PET) or nylon, a metal layer made of an aluminum material to maintain mechanical strength and prevent penetration of moisture and oxygen, and an inner resin layer made of a polyolefin-based material and serving as a sealing material due to thermal adhesiveness.

In the sheet material of the pouch case, a predetermined adhesive resin layer may be interposed between the inner resin layer and the metal layer and between the outer resin layer and the metal layer, if necessary. The adhesive resin layer is intended for smooth attachment between different kinds of materials and is formed as a single layer or a multilayer. The adhesive material may be commonly made of a polyolefin resin, or a polyurethane resin for smooth processing, or a mixture thereof.

In the cell assembly 10, the plurality of cells 11 are arranged in one direction to form a substantially stacked structure.

The cooling member 13 is for air-cooling the cell assembly 10 and includes a duct made of an aluminum material and having an air passage for moving a cooling air. An outer surface of the duct of the cooling member 13 located close to the cell assembly 10 is disposed in contact with the edge portion of the cell assembly 10. At this time, it is preferable that a heat transfer material portion 12 made of a thermal interface material (TIM) having high thermal conductivity is interposed between the edge portion of the cell assembly 10 and the cooling member 13. In this case, the outer surface of the duct of the cooling member 13 is disposed to directly contact the heat transfer material portion 12.

The interior of the duct of the cooling member 13 is formed in a truss structure formed by arranging frames to form a substantially triangular shape. By doing so, it is possible to improve the cooling performance and provide sufficient mechanical rigidity for protecting the cell assembly 10 from an external impact or the like.

Figure 4:
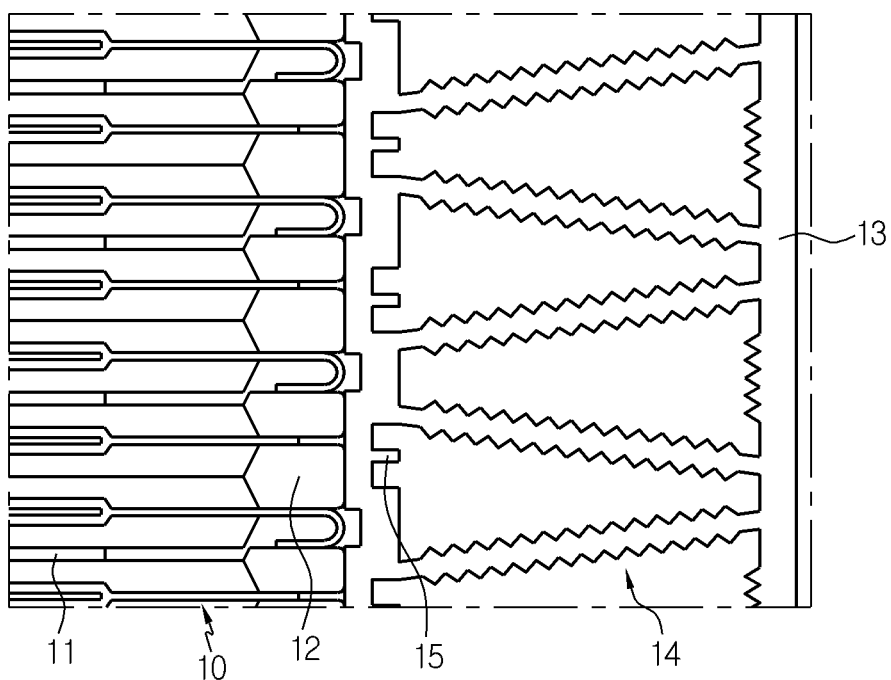
FIG. 4 is a partial cross-sectioned view of FIG. 3.
Figure 5:
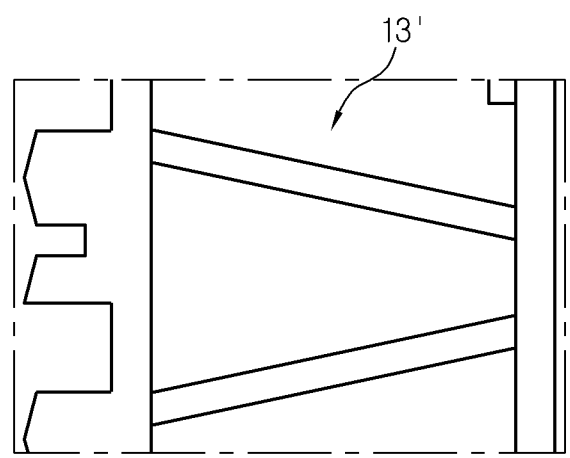
FIG. 5 is a partial cross-sectioned view showing a modified example of the truss structure provided in the duct of the cooling member depicted in FIG. 3.

In addition, an uneven pattern is formed in the duct of the cooling member 13. In particular, as shown in FIG. 4, it is preferable that the uneven pattern is mainly formed on the surface of the truss structure 14 to increase the surface area, in order to improve the cooling performance. Like a cooling member 13' shown in FIG. 5, the truss structure may also be modified not to include the uneven pattern.

Preferably, turbulence forming protrusions 15 are protruded at predetermined intervals on the inner wall of the duct of the cooling member 13. The turbulence forming protrusions 15 have a rod-type structure vertically protruding from the inner wall of the duct of the cooling member 13 to disturb the flow of passing air and form appropriate turbulence, thereby improving the cooling performance.

The cooling member 13 is respectively provided at both sides of the cell assembly 10 and is disposed to extend so that a longitudinal direction of the duct thereof is identical to a longitudinal direction of the cooling member 13.

An exhaust fan 16 is disposed to an outlet of the battery module at one end of the battery module in the longitudinal direction so that the air moving from one end of the cooling member 13 to the other end thereof is discharged in a vertically upward direction.

The battery module according to an embodiment of the present disclosure configured as above includes heat transfer material portions 12 provided at both side edge portions of the cell assembly 10, and the cooling member 13 having a duct structure is disposed in contact with the heat transfer material portion 12 to perform air cooling.

Since the truss structure 14 is provided in the duct of the cooling member 13, it is possible to sufficiently secure the rigidity and increase the heat transfer area. In addition, the heat transfer area may be further increased by means of the plurality of uneven patterns formed at the truss structure 14, thereby improving the cooling performance.

The cooling air introduced into an inlet located at one end of the cooling member 13 moves along the air passage in the duct of the cooling member 13 in the longitudinal direction of the battery module and then is forced out by the exhaust fan 16 at the outlet and discharged in a vertically upward direction.

In the battery module according to the present disclosure, since the cooling fin may be omitted unlike the conventional battery module, the space utilization in the thickness direction of the cell may be enhanced. In addition, due to the truss structure 14 provided in the duct of the cooling member 13, sufficient mechanical rigidity may be ensured, and it is possible to improve the cooling performance and reduce the cost.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

If the present disclosure is applied, it is possible to implement an air-cooling battery module having improved cooling performance and reinforced mechanical rigidity by the truss structure provided at the cooling member.

What is claimed is:

1. An air-cooling battery module, comprising:
   a cell assembly having a plurality of cells; and
   a cooling member having a duct disposed to contact an edge portion of the cell assembly and having an air passage formed therein so that a cooling air moves therethrough,
   wherein an inside of the duct has a truss structure having frames,
   wherein turbulence forming protrusions are formed at a recess of a first inner wall of the duct of the cooling member to protrude at predetermined intervals,
   wherein the turbulence forming protrusions are further located between adjacent frames of the truss structure,
   wherein the turbulence forming protrusions have a rod-type structure vertically protruding from the recess of the first inner wall of the duct of the cooling member,
   wherein the truss structure includes a first uneven pattern at surfaces of the frames,
   wherein a second uneven pattern is formed at a second inner wall that is inside of the duct of the cooling member, the second inner wall being opposite to and facing the first inner wall, and
   wherein the first inner wall and the second inner wall face each other.

2. The air-cooling battery module according to claim 1, further comprising:
   a heat transfer material portion provided between the edge portion of the cell assembly and the cooling member.

3. The air-cooling battery module according to claim 2, wherein an outer surface of the first inner wall of the duct of the cooling member is disposed to directly contact the heat transfer material portion.

4. The air-cooling battery module according to claim 1, wherein the duct of the cooling member is made of an aluminum material.

5. The air-cooling battery module according to claim 1, wherein the cooling member is respectively provided at both sides of the cell assembly and disposed to extend in a longitudinal direction of the cell assembly.

6. The air-cooling battery module according to claim 5, further comprising:
   an exhaust fan disposed at an outlet to discharge an air, moved from one end of the cooling member to the other end thereof, in a vertically upward direction.

7. The air-cooling battery module according to claim 1, wherein the turbulence forming protrusions extends from a floor of the recess to an inner surface of the first inner wall.

8. The air-cooling battery module according to claim 1, wherein a thickness of the frames of the truss structure is greater at the first uneven pattern than at opposite ends of the frames.

9. The air-cooling battery module according to claim 1, wherein the turbulence forming protrusions face the second uneven pattern in the duct at a location between adjacent frames of the truss structure.

* * * * *